(12) United States Patent
Sather et al.

(10) Patent No.: US 7,925,773 B2
(45) Date of Patent: Apr. 12, 2011

(54) VIRTUAL FORMAT FOR THE STORAGE OF STREAMING DATA

(75) Inventors: Dale Sather, Bellevue, WA (US); Ken Reneris, Seattle, WA (US); Matthijs Gates, Wellesley, MA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 11/767,370

(22) Filed: Jun. 22, 2007

(65) Prior Publication Data

US 2008/0320157 A1 Dec. 25, 2008

(51) Int. Cl.
G06F 15/16 (2006.01)
(52) U.S. Cl. .................................... 709/231
(58) Field of Classification Search .............. 709/231
See application file for complete search history.

(56) References Cited

U.S. PATENT DOCUMENTS

| | | | |
|---|---|---|---|
| 5,655,117 A | | 8/1997 | Goldberg et al. |
| 5,911,776 A | * | 6/1999 | Guck ............................ 709/217 |
| 5,915,094 A | | 6/1999 | Kouloheris et al. |
| 6,065,010 A | * | 5/2000 | Otsuka et al. .................. 707/101 |
| 6,085,199 A | * | 7/2000 | Rose .......................... 707/104.1 |
| 6,157,929 A | | 12/2000 | Zamiska et al. |
| 2001/0049728 A1 | | 12/2001 | Kang |
| 2002/0116517 A1 | | 8/2002 | Hudson et al. |
| 2004/0028042 A1 | | 2/2004 | Srinivasan et al. |
| 2004/0244058 A1 | * | 12/2004 | Carlucci et al. ................ 725/135 |
| 2004/0264489 A1 | | 12/2004 | Klemets et al. |
| 2005/0193005 A1 | | 9/2005 | Gates et al. |
| 2006/0041679 A1 | | 2/2006 | Feig |

OTHER PUBLICATIONS

Network workign Group, RFC:2250 RTP payload format for MPEG1/2 Video AT&T Labs—Research Jan. 1998 http://www.rfc-editor.org/rfc/rfc2250.txt.*
Rangan, et al., "Efficient Storage Techniques for Digital Continuous Multimedia", IEEE Transactions on Knowledge and Data Engineering, vol. 5, No. 4, Aug. 1993, pp. 564-573.
Mauro, "Oracle interMedia: Managing Multimedia Content", May 2005, Oracle Corporation, pp. 20.
Brussee, et al., "Content Distribution Networks", Jun. 1, 2001, Telematica Instituut, pp. 98.

* cited by examiner

*Primary Examiner* — Dohm Chankong
*Assistant Examiner* — Tauqir Hussain
(74) *Attorney, Agent, or Firm* — Alleman Hall McCoy Russell & Tuttle LLP

(57) ABSTRACT

Systems and methods for storing streaming data are provided. A system is disclosed that includes a computer program which, when executed on a computing device, is configured to store a data stream in memory of the computing device in a virtual file format. The virtual file format may include a timeline of events. The events in the timeline may include a plurality of spanning events. Each spanning event may contain respective state information representing a state of the data stream across an interval in the timeline, and may be linked to at least one other spanning event.

14 Claims, 7 Drawing Sheets for i < K:

$P_i <= P_k$, and
    offset(i) < offset(k)

RELATIONSHIP BETWEEN OFFSET AND
POSITION OF EVENT IN TIMELINE

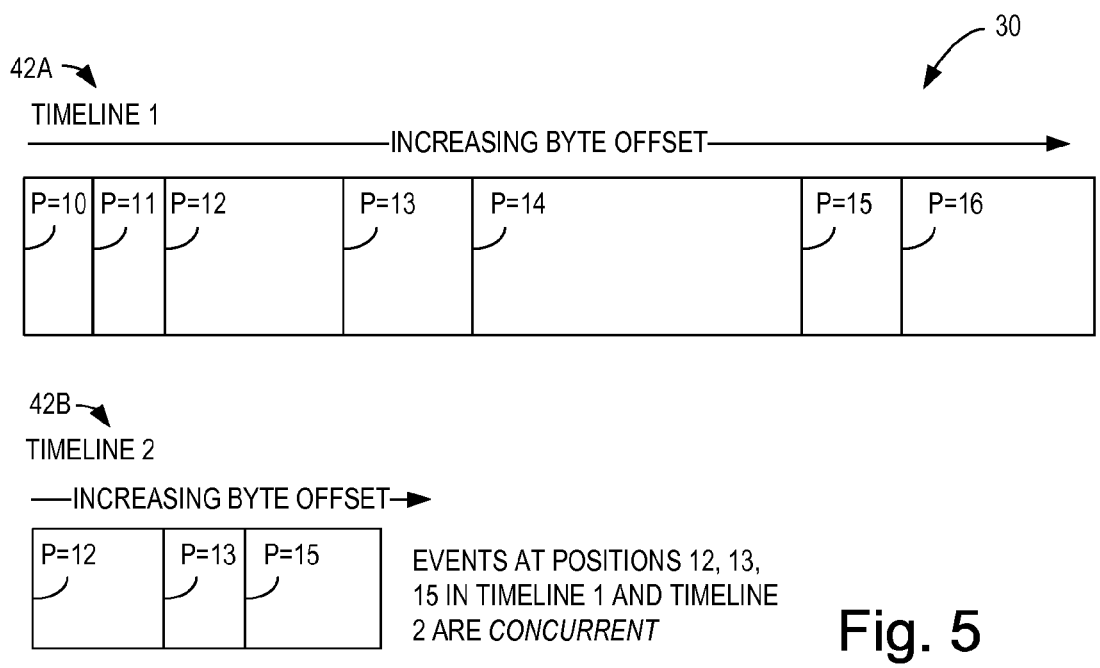
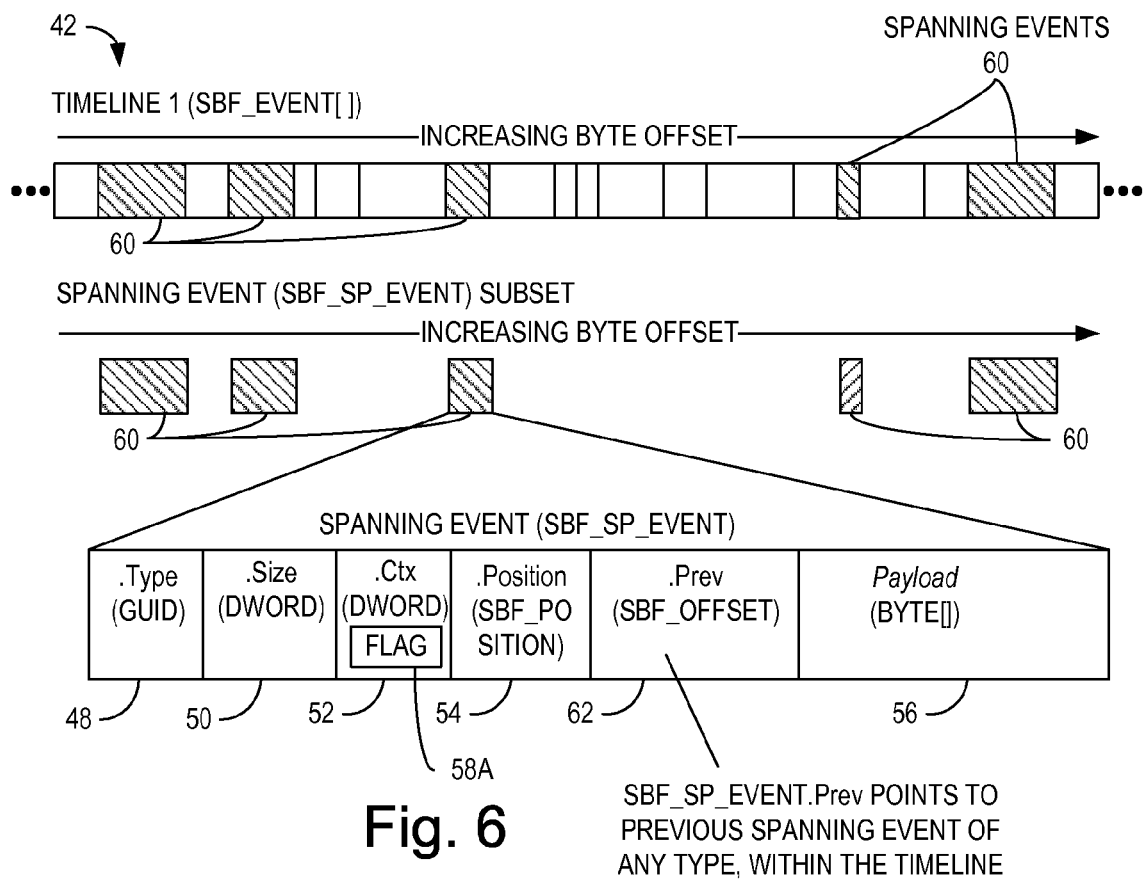

VIRTUAL FORMAT FOR THE STORAGE OF STREAMING DATA

BACKGROUND

Recording streams of data, such as digital television streams, can be a complicated task. Once recorded, manipulation of the recorded video stream also poses challenges. For example, it may be desirable to add metadata to a recorded video stream to describe an attribute of the video stream that is in effect over a range of time. To accomplish this by prior techniques, an instantaneous event would be inserted into a video stream at a location in the stream where the metadata commenced, i.e., a start position. To change the value of the attribute at a given point in time later in the stream, another instantaneous event would be inserted at a downstream location, which changed the value of the attribute or turned the attribute off. Another prior approach involved writing all metadata event information into each and every event in the data stream.

These techniques have several drawbacks. First, inserting the metadata into a recorded stream may require the entire stream to be altered, which is processor intensive and time consuming. Second, determining a current state of a recorded stream at an arbitrary point in the stream is difficult when represented by instantaneous events, because this requires searching backwards from the point of inquiry through the entire stream for all instantaneous events that set metadata or otherwise affect the state of the stream at the arbitrary point in the stream. This is also processor intensive and time consuming. Third, adding all metadata to each and every event in the data stream results in a undesirably large size. As a result, these prior techniques may result in slow access, and an undesirable user experience for users who record and manipulate data streams, such as digital television streams.

SUMMARY

The present disclosure relates to systems and methods for storing streaming data. A system is disclosed that includes a computer program which, when executed on a computing device, is configured to store a data stream in memory of the computing device in a virtual file format. The virtual file format may include a timeline of events. The events in the timeline may include a plurality of spanning events. Each spanning event may contain respective state information representing a state of the data stream across an interval in the timeline, and may be linked to at least one other spanning event. The spanning events may be accessed to determine the state of the data stream at a target position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a schematic view illustrating concurrent events in each of a plurality of timelines in the virtual file format of FIG. 2.

FIG. 6 is a schematic view of spanning events within the timeline of FIG. 3.

DETAILED DESCRIPTION

Figure 1:
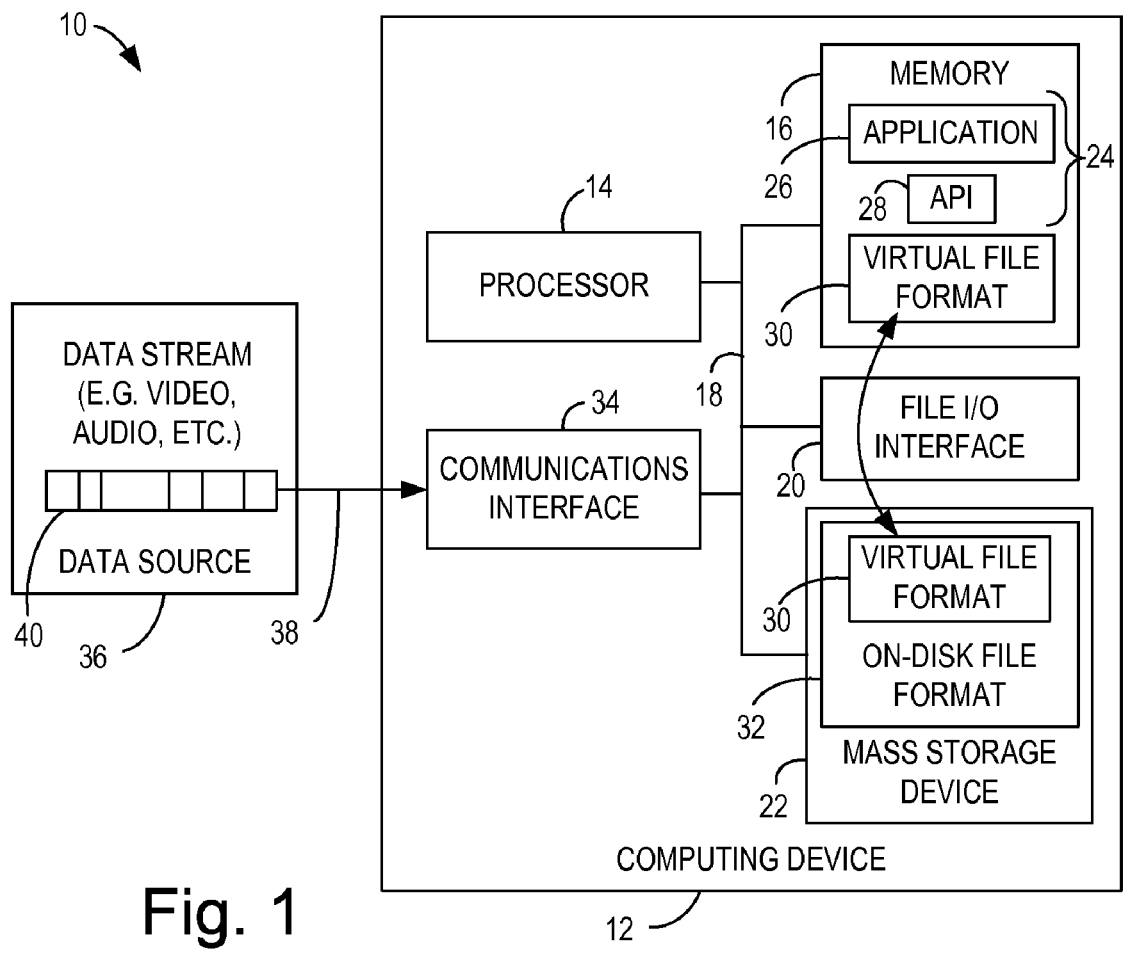
FIG. 1 is a schematic view of one embodiment of a system for storing streaming data.

FIG. 1 illustrates one embodiment of a system 10 for storing streaming media in a virtual format. System 10 typically includes a computing device 12 having a processor 14 and associated memory 16 linked by a communications bus 18. A file input output interface 20 may be provided to store files in memory 16 onto a mass storage device 22, such as a hard drive. Processor 14 may be configured to execute one or more computer programs 24, including application program 26 and application programming interface (API) 28, using portions of memory 16 and mass storage device 22. Computer programs 24 may store data in memory 16 in a virtual file format 30, which is in turn stored on mass storage device 22 in an on-disk file format 32, via the file input output interface 20.

In one example, API 28 may act as an intermediary between one or more application programs 26 and data stored in the virtual file format. Thus, API 28 may be configured to receive and process requests to store and retrieve data in the virtual file format 30 from one or more application programs 26, and process the requests accordingly. Alternatively, application program 26 may be configured to directly store and retrieve data from the virtual file format 30.

Computing device 12 may be provided with a communications interface 34 configured to communicate with a data source 36 via a communications link 38, such as a network connection, USB connection, firewire connection, etc. The data source 36 may be a streaming media data source configured to output a data stream 40, for example containing streaming audio data and/or streaming video data, which is received by the communications interface 30 via the communications link 38. The application program 26 may be configured to read the data from the communications interface 34, and to record the data stream 40 by storing the data stream 40 in the virtual file format 30 in memory 16, which in turn is stored in on-disk file format 32 on mass storage device 22.

Figure 2:
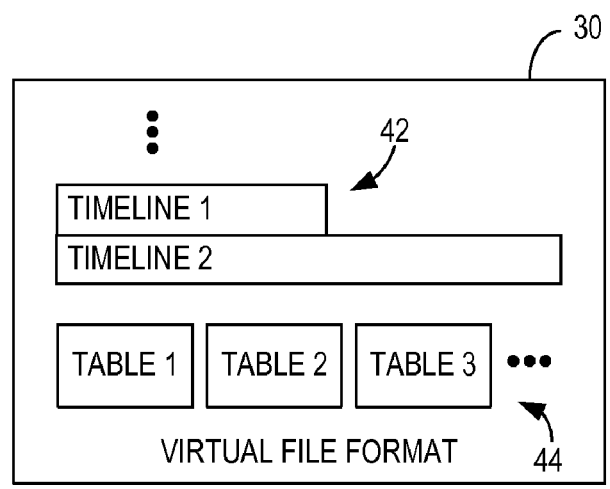
FIG. 2 is a schematic view of a software architecture of a virtual file format of the system of FIG. 1.

As shown in FIG. 2, virtual file format 30 includes one or more timeline 42 and one or more tables 44. One of the timelines may be designated as a root timeline, to which other timelines are referenced, such as a timeline in which time is represented, as discussed below. The timelines 42 may be used to store streaming data, and metadata and other data related thereto, and the tables 44 may be used to index the data in the timelines for quick recall.

Figure 3:
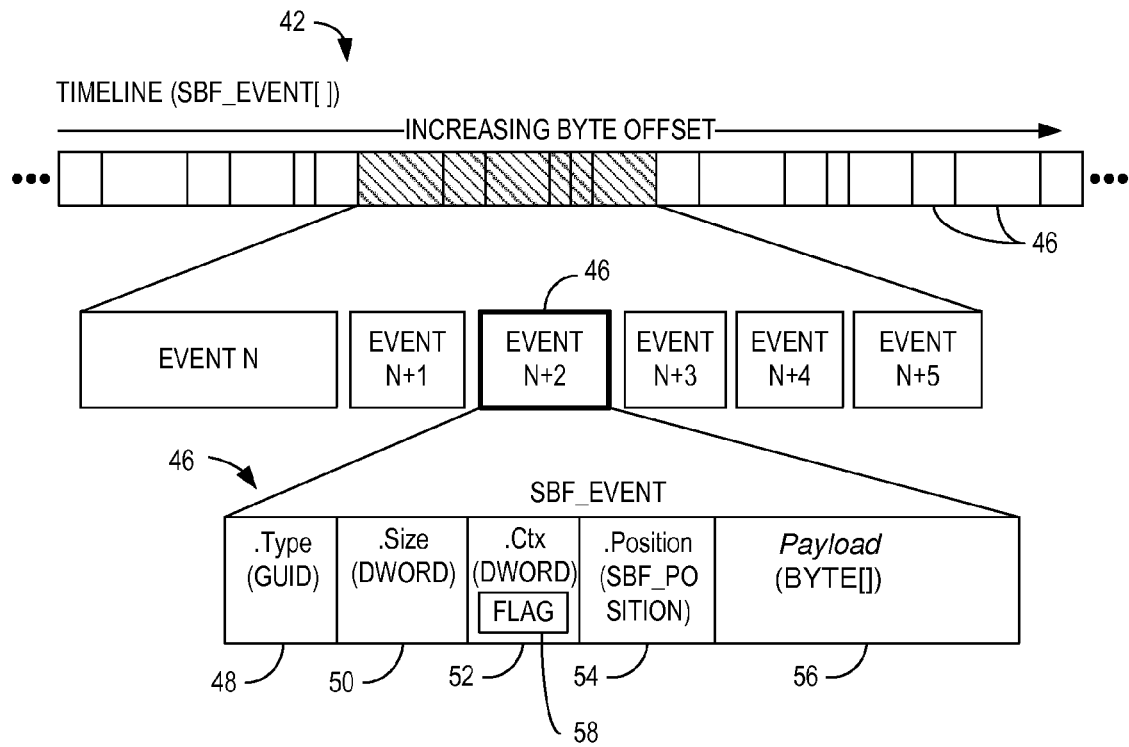
FIG. 3 is a schematic view of a timeline and event of the virtual file format of FIG. 2.

As shown in FIG. 3, each timeline 42 is a data structure that is an array of events 46, which are ordered in an increasing byte offset from a beginning of the timeline. While each timeline 42 is an array of events 46 ordered in an increasing byte offset in the virtual file format 30, it will be appreciated that the timeline 42 may be stored in the on-disk file format 32 in an independent manner. For example, a name for the timeline 42 may be stored in a master file table in the on-disk file format, and the data in the timeline may be stored as a value associated with the name in runs located at various addressed locations on the disk. Thus, it will be appreciated that the byte offset in the timeline 42 in the virtual file format 30 is independent of the physical location of the data for timeline 42 as stored in the on-disk file format 32.

Events 46 are constructs which carry data. Each of events 46 may include a type 48, a size 50, a context 52, a position 54, and/or a payload of data 56. Type 48 may be defined by a globally unique identifier (GUID). The type 48 may be well-known to the virtual file format, or alternatively, may not be known to the virtual file format. Examples of well-known event types include media sample, state table, and seekpoint, which will be explained below. An example of an event type that may not be known to the virtual file format is an attribute of a sample that is encoded as metadata. The nomenclature SBF_EVENT may be used to refer to an event, and SBF_EVENT.Type may refer to the type of the event.

Context 52 may include one or more flags 58, which may be used to indicate a context for the event. Context 52 may also contain data indicating the timeline with which the event is associated. It will be appreciated that events need not include a payload 56 of data, or may include a payload set to nullset, zero bytes in length, etc. Such events with empty data fields may be used to indicate that a state is no longer active, as will be explained below.

Each event has an offset indicating its distance in bytes from the beginning of the timeline. In the Figures, the byte offset increases to the right. In some embodiments, all events may be aligned on 64-bit boundaries in the timeline. Thus, there may be a gap of some number of bytes to ensure the alignment following an event that has a size that is non-64-bit aligned.

Figure 4:
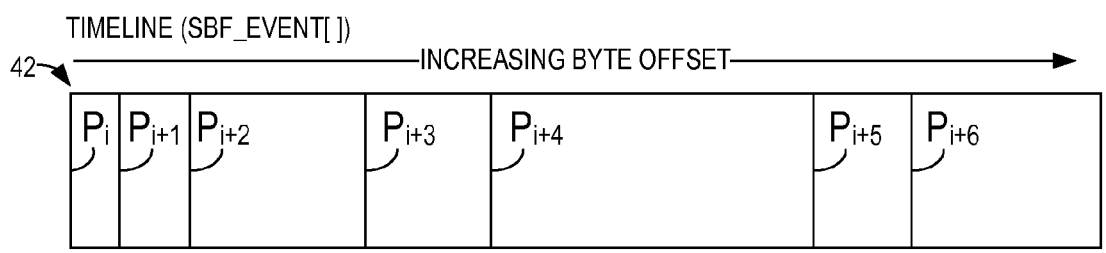
FIG. 4 is a schematic view illustrating a relationship between offset and position of events within the timeline of FIG. 3.

Events 46 are of variable size, are identifiable, and have well-defined positions 54 within the data stream as a whole that are global to the virtual file format. The position 54 of an event indicates its position in the data stream stored in the virtual file format, rather than its byte offset in a timeline. Thus, it will be appreciated that the position of an event in the data stream is different from its offset in a timeline, although the two concepts are related as illustrated in FIG. 4. In contrast to the byte offset, which represents distance in bytes along the timeline, the position 54 of an event is similar to a counter value. Successive events may have incrementing position values, although they may be separated by many bytes. FIG. 4 illustrates that as the position Pi of an event increases so does the offset of the event, i.e., for i less than or equal to k, Pi is less than or equal to Pk and Offset(i) is less than or equal to Offset(k).

Referring to FIG. 5, since event position is global to the virtual file format, it will be appreciated that events in a plurality of different timelines within the virtual file format may be ordered relative to each other within the data stream as a whole. Events that have the same position value are said to be concurrent in the virtual file format. Because the position is global to the file, events in more than one timeline can be concurrent. For example, if a sample attribute is inserted after the file is created, and rather than upsetting and reordering the entire timeline with an insertion, a new timeline may be created, and the attribute may be added to the new timeline, with the same position value. Thus, as shown in FIG. 5, events at positions 12, 13, and 15 in a first timeline 42A and a second timeline 42B are concurrent.

As illustrated in FIG. 6, the timeline 42 of virtual file format 30 may further include one or more spanning events 60. A spanning event is persistent, that is, it exists until it is replaced or erased, and it is part of the state for events that follow in position on its stream. Examples of a spanning event include stream format, such as MPEG or WMV, or stream encoding such as standard definition (SD) or high definition (HD). Once a spanning event for stream format or encoding is set, the format or encoding applies to all same-stream samples that follow, that is, the spanning event is persistent. Querying the virtual file format to recover state from spanning events has speed efficiency over prior techniques that required querying all events in a stream to find those events which affected state, and has size efficiency over methods which require the state information to be written into each event.

An event may be indicated as a spanning event through setting a spanning event flag 58A within context field 52. Each spanning event further includes a previous field 62, configured to contain a pointer to the next previous spanning event, of any type, in the same timeline. The previous field may be represented by the nomenclature SBF_SP_EVENT.prev, for example. The previous field may indicate the byte offset in the timeline of the next previous spanning event. Alternately, the previous field may indicate a next previous spanning event in another suitable manner.

Figure 7:
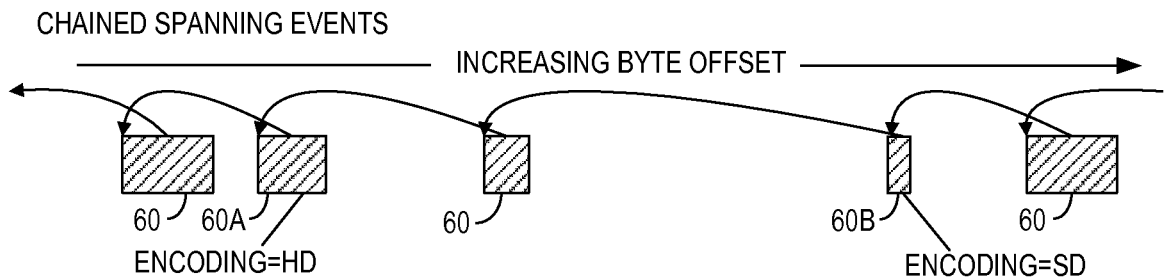
FIG. 7 is a schematic view of illustrating chaining of the spanning events of FIG. 6.

As illustrated in FIG. 7, the inclusion of a pointer to the next previous spanning event enables the spanning events to be chained together. Spanning events may be used to represent the state of a data stream, and the state for a selected attribute may be recovered, i.e. detected, for an arbitrary or user-selected position in the data stream by traversing backwards to a spanning event, and then traversing backwards along the spanning event chain, until a spanning event with a value for the attribute is found. This saves processor time over traversing backwards through all events in the timeline, and results in a smaller file than inclusion of all metadata event information in each event in the data stream.

In the example illustrated in FIG. 7, the spanning event 60A may be a encoding spanning event that indicates that the video stream from that point forward is encoded in a first format, HD, and a second spanning event 60B may be a format spanning event that indicates that the video stream from that point forward is encoded in a second format, SD. Thus, the spanning event 60A describes the state of the format of the stream over the interval between spanning event 60A and spanning event 60B. Spanning event 60B describes the format of the stream from that point forward, until the end of the stream, or the next format spanning event.

As discussed above, data relating to the spanning events, and other data associated with the timeline 42 may be encoded in a table 44, which may be stored in-band in the timeline as an event itself, or may be stored elsewhere in the virtual file format. A table may be used, for example, to store data that is well-suited to tabular storage, for example, indexes and global metadata. Data in a table is arranged contiguously. Adding entries to or removing entries from the end of a table is relatively inexpensive, but inserting or removing entries that are not at the end causes data to be moved to maintain the contiguous layout, which is processor intensive. It will be appreciated that each of tables 44 is bound to a respective timeline 42. If a table is global to the file, such as for stream time, then it is bound to the root timeline, as discussed below.

Figure 8:
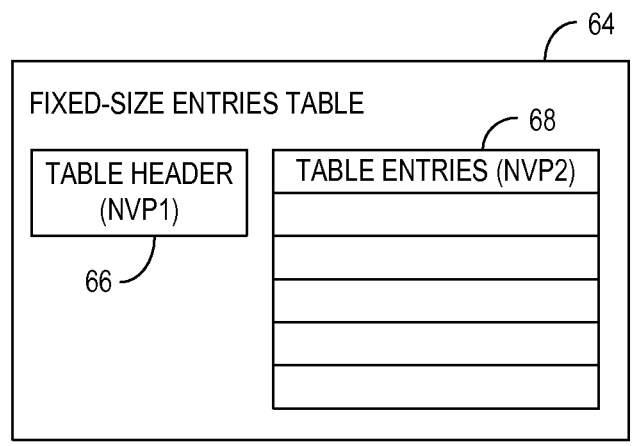
FIG. 8 is a schematic view of a fixed-size entries table of the virtual file format of FIG. 2.
Figure 9:
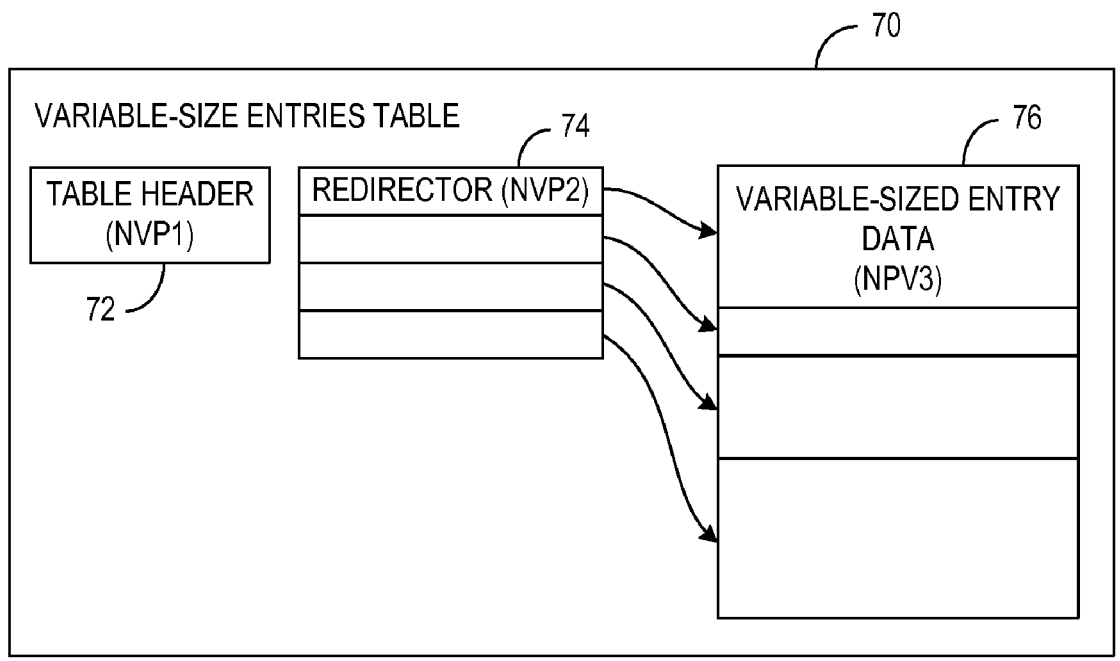
FIG. 9 is a schematic view of a variable-size entries table of the virtual file format of FIG. 2.

FIGS. 8 and 9 illustrate two table formats that may be used for tables 44, including a fixed-sized entries table 64 and a variable-sized entries table 70. Fixed-sized entries table typically includes a table header 66, in the form of a first name value pair, and a list of fixed-sized entries 68, in the form of a second name value pair. The header 66 has a string name of the table, such as "time", as well as entry size information, an identifier indicating the stream to which the table is bound, and the first open entry available to take data, which is included to optimize performance. Table entries 68 are stored in another name value pair, as non-resident data, backed by either long pages or short pages. The entries in the table will have a format that is defined by the content of the table. The only requirement at the virtual file format layer is that the table entries all be the size that is specified in the header, for example at SBF_TABLE_HEADER.EntrySize.

Variable-sized entries table 70 includes a table header 72, also in the form of a first name value pair, a redirector 74, in the form of a second name value pair, and a list of variable sized entry data 76, in the form of a third name value pair. The header name value pair is similar to the header of the like the fixed-size entries header, except that the specified entry size (SBF_TABLE_HEADER.EntrySize) has a value indicating that the size is variable, e.g. SBF_ENTRY_SIZE_VARIABLE. The redirector contains the offsets to each of the variable-sized entries. The redirector itself has fixed-size entries, so it allows constant lookups into the variable-sized entries, e.g. using the lookup Entry[N]=Entries[Redirector[N]].

Figure 11:
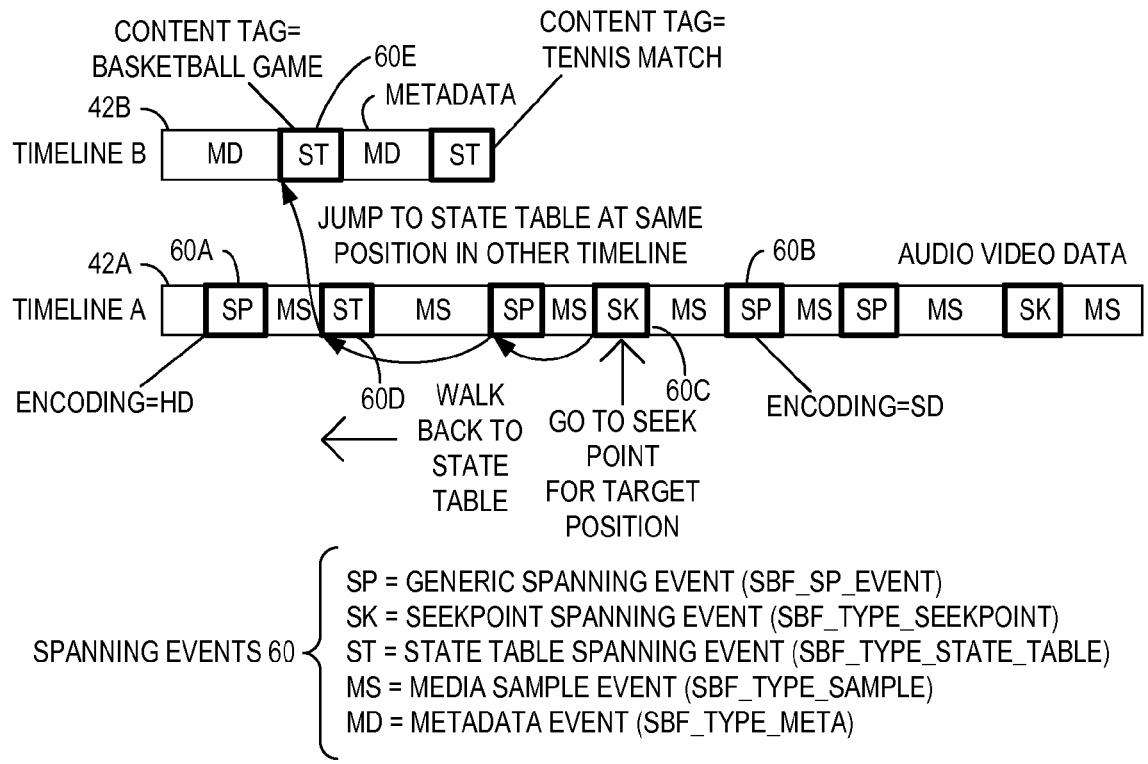
FIG. 11 is a schematic view illustrating recovering state of a data stream stored in the virtual file format of FIG. 10, by walking back from a seekpoint.

In some embodiments, a plurality of spanning events in effect at a given point in a timeline may be consolidated into a spanning event table ST, as illustrated in FIG. 11. A spanning event table ST is typically a variable-sized entries table 70. The spanning event table ST is itself a spanning event and occurs in-band in the timeline 42, as a timeline event 46 of well-known type to the virtual file format 30. Although requiring additional memory space, consolidation of spanning events 60 into a spanning event table ST may decrease the search time necessary for recovery of the state of a stream.

An algorithm may be implemented in computer program 24 to determine those spanning events 60 that change infrequently and store those infrequently changing spanning events in an in-band spanning events table ST for efficient lookup. The algorithm may further be configured to determine those spanning events that occur frequently, and omit such frequent spanning events from spanning events tables, in the case where a timeline lookup of frequent spanning events would be more efficient than storing these frequent spanning events in spanning event tables.

Figure 10:
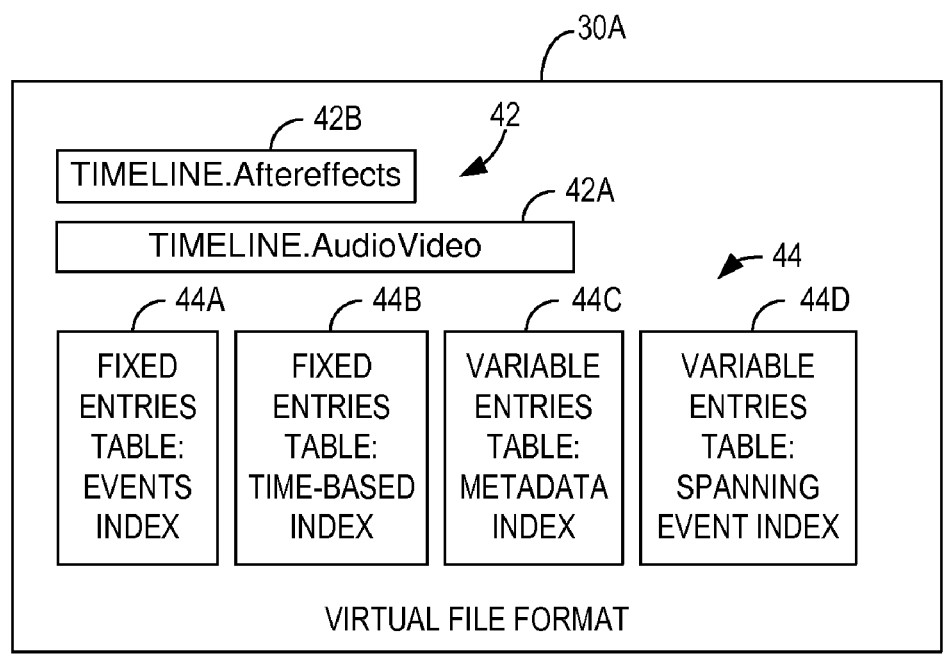
FIG. 10 is a schematic view of another embodiment of a virtual file format of the system of FIG. 1.

FIG. 10 illustrates an embodiment of a virtual file format 30A for use with data streams containing audio and/or video. Virtual file format 30A includes a plurality of timelines 42, including a first timeline 42A, which is an audiovideo data stream timeline, and a second timeline 42B, which is an aftereffects timeline. The audiovideo data stream is configured to contain the audio and video itself, and certain other data associated with the audio and video, such as format, length, etc. The aftereffects timeline is intended to include other data created after the creation of the audio and video data stream, including metadata regarding the content of the audio video stream, etc. It will be appreciated that the audio-video data stream timeline may be designated as a root timeline for the virtual file format 30A.

Virtual file format 30A also may include an events index 44A, a time-based index 44B, a metadata index 44C, and a spanning event index 44D. Events index 44A may be a fixed-entry length table 64 including table entries representing the byte offset and identity of all events in timeline. The time-based index 44B may be a fixed-length entries table 64, and may include entries that correlate event position 54 in the virtual file format to an absolute time scale. The metadata index 44C may be a variable-length entries table containing metadata events in the audiovideo timeline. Spanning event index 44E typically is a variable length entries table including a list of all spanning events in timeline 42A.

As illustrated in FIG. 11, timeline 42A of virtual file format 30A may include a plurality of well-known events, including seekpoints SK, spanning events SP, spanning event state tables ST, media samples MS, and metadata MD. Seekpoints are points from which optimal resumption of the audiovideo stream may occur, and are typically set at a predetermined interval throughout the audiovideo timeline, such as every half second, although any suitable interval may be selected, such as every second or two seconds. Borrowing from the example used in FIG. 6, the first timeline 42A may carry audiovideo data in the form of a plurality of media samples MS. These are encoded in HD at the beginning of the stream, which is indicated in a spanning event 60A. The format is changed to SD towards the end of the stream, which is indicated by spanning event 60B. To recover the state of the stream at a target position, a search algorithm first goes to a seekpoint SK, such as indicated at 60C, and then traverses backwards along chained spanning events until a most recent state table ST, indicated at 60D, is reached. State information is retrieved for the first stream from the state table ST at 60D, which will indicate that the value of the encoding attribute of the state is HD.

In addition, the state table may provide a pointer to spanning events which contain state information for events of a concurrent position in the second timeline 42B. For example, the state table at 60D may include a pointer directly pointing to a state table indicated at 60E associated with a concurrent position in the second timeline 42B. Thus, it can be determined from the state table at 60E that the content tag of the data stream at the target position indicates that the data stream is a basketball game. Later in the second timeline 42B, the content tag changes value to indicate the data stream is a tennis match. Alternatively, it will be appreciated that the state table at 60E associated with a concurrent position in timeline 42B may be located via spanning events index 44D. In this way attributes of the state of the audiovideo stream in effect at the target position, which are contained in both the first and second timelines, may be efficiently recovered.

Figure 12:
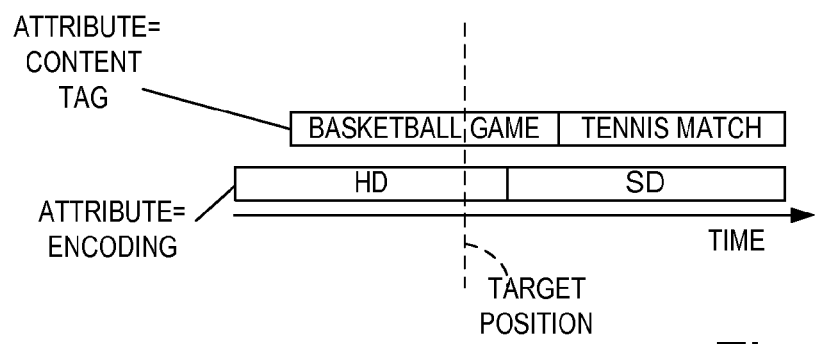
FIG. 12 is a schematic view illustrating the states recovered via the process illustrated in FIG. 11.

FIG. 12 illustrates on a time axis attributes of the data stream encoded in FIG. 11. As can be seen, for a target position 78 indicated in dashed lines, the value of the encoding attribute indicates that the content is encoded in HD, and the value of the content tag indicates that the content is basketball game. Thus the state of the data stream at the target position 78 is a basketball game in HD encoding.

It will be appreciated that target position 78 at which the state of the data stream is to be analyzed may be selected so as to coincide with a seekpoint SP, as illustrated in FIG. 11, to optimize rapid searching. Alternatively, the computer program 24 may be configured to allow free selection of a target position 78 at a arbitrary or user-selected position within the data stream, and a search algorithm in the computer program can be configured to search backwards from the arbitrary or user selected position to find the most recent spanning event SP that occurs at or prior to the target position, and which affects a target attribute of the state of the data stream.

Figure 13:
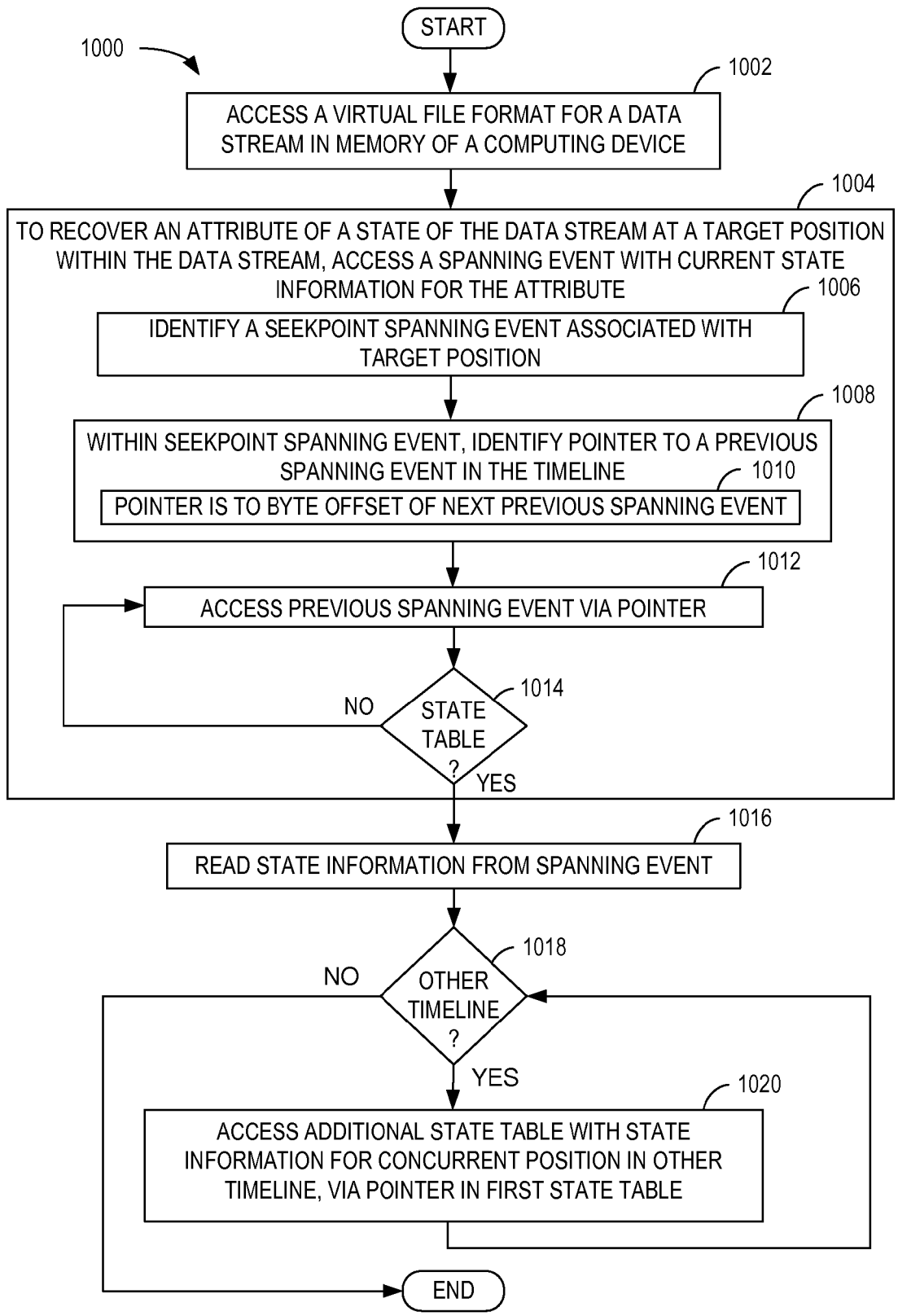
FIG. 13 is a flowchart illustrating one embodiment of a method for storing streaming data.

FIG. 13 illustrates one embodiment of a method 1000 for storing streaming data. Method 1000 includes, at 1002, accessing a virtual file format for a data stream stored in memory of a computing device, the virtual file format including a timeline of events. The virtual file format may be of the types described above, or another suitable type. Further, it will be appreciated that the data stream may contain audio and/or video data, metadata related thereto, etc.

At 1004, the method may include, to recover an attribute of a state of the data stream at a target position within the data stream, accessing a spanning event with current state information for the attribute. At 1016, the method may further include reading state information from the spanning event accessed at 1004.

A variety of methods may be used to access the spanning event with current state information for the attribute at 1004. For example, at 1006, the method may include identifying a seekpoint spanning event associated with the target position. At 1008, the method may include identifying a pointer to a previous spanning event in the timeline, within the seekpoint spanning event. As illustrated at 1010, the pointer may indicate a byte offset of a next previous spanning event. At 1012, the method may include accessing the previous spanning event via the pointer. And, at 1014, the method may include determining whether the previous spanning event is a state table (YES at 1014), and if so, the method may include reading state information regarding the attribute at 1016, from the state table. If the previous spanning event is not a state table (NO at 1014), then the method may include backwardly traversing one or more spanning events in the timeline via a previous spanning event pointer contained in each respective spanning event, until a state table spanning event is reached.

Alternatively, instead of or in addition to the steps outlined in 1006-1004, the method may include reading state information from spanning events in the timeline in another manner, such as those described above. For example, instead of accessing a seekpoint and/or state table, state information may be read directly from spanning events that are not seekpoints or state tables, which are previous to or concurrent with the target position, and which affect the current state of the attribute.

At 1018, the method may include determining whether there is another timeline in the virtual file format. If it is determined that there is another timeline (YES at 1018), then the method may further include, at 1020, accessing an additional state table in the other timeline with state information for the target position that is based on one or more events in the other timeline. If it is determined that there is not another timeline (NO at 1018) then the method ends.

The above described systems and methods may be used to efficiently store and retrieve streaming data from a virtual file format on a computing device.

It should be understood that the embodiments herein are illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A computer-readable storage device, comprising: a computer program that, when executed on a computing device, is configured to store a data stream in memory of the computing device in a virtual file format, the virtual file format including a timeline of events, wherein the event type is selected from the group consisting of media sample, seekpoint, and state table, and wherein events of the seekpoint and state table type are spanning events, the events in the timeline including a plurality of spanning events, each spanning event containing respective state information representing a state of the data stream across an interval in the timeline, and being linked to at least one other spanning event;

wherein each of the spanning events is configured to contain a pointer that refers to a byte offset of a previous spanning event in the timeline, if present;

wherein the computer program is configured to recover an attribute of a state of the data stream at a target position within the data stream, by accessing a spanning event with current state information for the attribute, and reading the state information from the spanning event; and wherein the computer program is configured to access a spanning event with current state information for the attribute by identifying a seekpoint spanning event associated with the target position, identifying a pointer in the seekpoint spanning event to a previous spanning event in the timeline, accessing the previous spanning event via the pointer, and reading state information from the previous event.

2. The computer-readable storage device of claim 1, wherein events are ordered according to a byte offset in the timeline, and wherein each event has a position that is independent of the byte offset of the event.

3. The computer-readable storage device of claim 2, wherein the timeline is a first timeline, wherein the virtual file format further includes a second timeline.

4. The computer-readable storage device of claim 3, wherein a plurality of events from the first timeline and/or the second timeline that have the same position are concurrent in the data stream.

5. The computer-readable storage device of claim 1, wherein each event is configured to include a type, size, context, and/or payload.

6. The computer-readable storage device of claim 5, wherein an event with no payload acts to signal the end of a state in the timeline.

7. The computer-readable storage device of claim 1, wherein each state table includes consolidated state information from a plurality of spanning events that affect at least one attribute of the state of the data stream at a position.

8. The computer-readable storage device of claim 7, wherein the state table is a variable-length entries table, including a header, a redirector, and entries of variable length, wherein the redirector is configured to reference a start of each variable-length entry in the table.

9. The computer-readable storage device of claim 1, wherein the previous spanning event is a state table.

10. A computing device, comprising:
a processor;
memory; and
a mass storage device containing programming stored thereon that is executable by the processor to perform a method for storing streaming data, the method comprising,
accessing a virtual file format for a data stream stored in the memory of the computing device, the virtual file format including a timeline of events, to recover an attribute of a state of the data stream at a target position within the data stream, wherein the event type is selected from the group consisting of media sample, seekpoint, and state table, and wherein events of the seekpoint and state table type are spanning events, accessing a spanning event with current state information for the attribute, the spanning event being linked to at least one other spanning event; and reading state information from the spanning event;

wherein accessing a spanning event with current state information for the attribute includes:

identifying a seekpoint spanning event associated with the target position;

identifying a pointer to a previous spanning event in the timeline, within the seekpoint spanning event;

accessing the previous spanning event via the pointer; and if the previous spanning event is a state table, reading state information from the state table, and if the previous spanning event is not a state table, backwardly traversing one or more spanning events in the timeline via respective spanning event pointers contained in the one or more spanning events, until a state table spanning event is reached.

11. The computing device of claim 10, wherein the method further comprises:

determining that there is another timeline in the virtual file format; and accessing an additional state table in the other timeline with state information for the target position that is based on one or more events in the other timeline.

12. The computing device of claim 10, wherein the data stream contains audio and/or video data.

13. A computing device, comprising:

a processor;

memory; and a mass storage device containing a computer program thereon that when executed on the computing device is configured to store a data stream in the memory of the computing device in a virtual file format;

wherein the virtual file format includes a timeline of events, wherein the event type is selected from the group consisting of media sample, seekpoint, and state table, and wherein events of the seekpoint and state table type are spanning events;

wherein the timeline further includes a plurality of spanning events containing respective state information about the data stream;

wherein each spanning event is configured to reference a previous spanning event in the timeline, if present, by inclusion within each spanning event of a byte offset in the timeline of the respective previous spanning event;

wherein the computer program is configured to recover an attribute of a state of the data stream at a target position within the data stream, by accessing a spanning event with current state information for the attribute, and reading the state information from the spanning event; and wherein the computer program is configured to access a spanning event with current state information for the attribute by identifying a seekpoint spanning event associated with the target position, identifying a pointer in the seekpoint spanning event to a previous spanning event in the timeline, accessing the previous spanning event via the pointer, and reading state information from the previous event.

14. The computing device of claim 13, wherein the timeline further includes a state table having state information that has been consolidated from a plurality of spanning events.

* * * * *